United States Patent
Yamada et al.

(10) Patent No.: US 8,997,527 B2
(45) Date of Patent: Apr. 7, 2015

(54) APPARATUS AND METHOD FOR MANUFACTURING OPTICAL FIBER PREFORM

(71) Applicant: Fujikura Ltd., Koto-ku, Tokyo (JP)

(72) Inventors: Naritoshi Yamada, Sakura (JP); Yuichi Kato, Sakura (JP)

(73) Assignee: Fujikura Ltd., Tokyo (JP)

( * ) Notice: Subject to any disclaimer, the term of this patent is extended or adjusted under 35 U.S.C. 154(b) by 169 days.

(21) Appl. No.: 13/683,230

(22) Filed: Nov. 21, 2012

(65) Prior Publication Data

US 2013/0074552 A1    Mar. 28, 2013

Related U.S. Application Data

(63) Continuation of application No. PCT/JP2011/062189, filed on May 27, 2011.

(30) Foreign Application Priority Data

May 27, 2010  (JP) ................ 2010-121902

(51) Int. Cl.
C03C 25/10 (2006.01)
C03B 37/014 (2006.01)

(52) U.S. Cl.
CPC ........... C03C 25/104 (2013.01); C03B 37/0142 (2013.01); C03B 2207/06 (2013.01); C03B 2207/12 (2013.01); C03B 2207/20 (2013.01); C03B 2207/22 (2013.01)

(58) Field of Classification Search
CPC ............ C03B 37/0142; C03B 2207/06; C03B 2207/20; C03B 2207/22; C03C 25/104

USPC .................................................. 65/421, 531
See application file for complete search history.

(56) References Cited

U.S. PATENT DOCUMENTS

2005/0132749 A1*  6/2005  Otsuka et al. .................. 65/17.4

FOREIGN PATENT DOCUMENTS

| CN | 1436743 A | 8/2003 |
|----|-----------|--------|
| CN | 101519269 A | 9/2009 |
| JP | 59-232933 A | 12/1984 |
| JP | 4-044336 U | 4/1992 |
| JP | 4-170336 A | 6/1992 |

(Continued)

OTHER PUBLICATIONS

Office Action issued by Chinese Patent Office in Chinese Application No. 201180025290.X mailed Jun. 30, 2014.

(Continued)

*Primary Examiner* — Queenie Dehghan
(74) *Attorney, Agent, or Firm* — Sughrue Mion, PLLC

(57) ABSTRACT

Provided is a method for manufacturing an optical fiber preform using a combustion burner. The method includes at least one of: a step α of, when a mode is changed from a deposition mode to a non-deposition mode, changing a gas discharged from a combustion gas port of the burner from a combustion gas to a purge gas, while maintaining a pilot light and a flow rate of a supporting gas from supporting gas discharge nozzles of the burner so that the nozzle tip does not glow; and a step β of, when the mode is changed from the non-deposition mode to the deposition mode, changing a gas discharged from the combustion gas port from a purge gas to a combustion gas, while maintaining a pilot light and the flow rate of the supporting gas so that the nozzle tip does not glow.

4 Claims, 6 Drawing Sheets

(56) References Cited

FOREIGN PATENT DOCUMENTS

| | | | |
|---|---|---|---|
| JP | 4-175239 A | | 6/1992 |
| JP | 04170336 A | * | 6/1992 |
| JP | 6-247722 A | | 9/1994 |
| JP | 11-079774 A | | 3/1999 |
| JP | 2003-212554 A | | 7/2003 |
| WO | 2009/107392 A1 | | 9/2009 |

OTHER PUBLICATIONS

International Search Report dated Aug. 30, 2011 from the International Searching Authority in counterpart application no. PCT/JP2011/062189.

* cited by examiner

APPARATUS AND METHOD FOR MANUFACTURING OPTICAL FIBER PREFORM

CROSS REFERENCE TO RELATED APPLICATIONS

This application is a continuation application based on a PCT Patent Application No. PCT/JP2011/062189, filed May 27, 2011, whose priority is claimed on Japanese Patent Application No. 2010-121902 filed May 27, 2010, the entire content of which are hereby incorporated by reference.

BACKGROUND OF THE INVENTION

1. Field of the Invention

The present invention relates to an apparatus and method for manufacturing an optical fiber preform using a so-called outside vapor-deposition method.

2. Description of the Related Art

Generally, in an apparatus for manufacturing an optical fiber preform on the basis of a manufacturing method which is called an outside vapor-deposition method, a rod-shaped target member is rotated by a glass lathe or the like while both ends thereof are held by the glass lathe, and glass particles generated in the flame of a flaming burner used for generating glass particles are deposited on the periphery of the target member. The target member may be removed in the subsequent process or may serve as a silica-based glass rod functioning as a core of an optical fiber obtained in the subsequent process.

A flame hydrolysis reaction or the like occurs in the flame by introducing a glass source material gas, a combustion gas, and a supporting gas into the flame of the burner and, glass particles, such as $SiO_2$ particles, are thereby generated. The glass particles are deposited on the periphery of the rotating target member as described above.

The deposition process is performed while the flaming burner used for generating glass particles is traversed in the axis direction of the target member to form a glass particle deposition layer on the periphery of the target member. When the deposition layer reaches a predetermined weight, the deposition process is completed.

The glass particle deposited body, which is a complex of the target member and the glass particle deposition layer formed in this way is subsequently heated in a high-temperature furnace, the glass particle deposition layer is sintered and vitrified into transparent glass to obtain an optical fiber preform.

In the apparatus for manufacturing an optical fiber preform, deposition of glass particles may be carried out by sequentially performing traverse of a plurality of flaming burners used for generating glass particle in a single direction. In this case, one burner performs glass particle generation and deposition in only the period from the deposition start point to the deposition completion point, and then returns to the deposition start point along a path deviating from the traverse path so as not to interfere with the other burners which perform deposition of the glass particles while being traversed. In the return period, the flame of the burner needs to be as small as possible. For this reason, in the related art, the flow rate of combustion gas and supporting gas is reduced as much as possible, or the flow rate of the combustion gas is significantly reduced while closing a supporting gas valve.

However, when the flow rate of the combustion gas and the supporting gas is reduced as much as possible in the return period from the deposition completion point to the deposition start point as described above, the vicinity of the nozzle of the flaming burner used for generating glass particles is burned and the nozzle tip glows, thereby significantly reducing the lifespan of the burner.

With respect to the foregoing problems, for example, the following methods have been proposed: a method (for example, see Japanese Unexamined Patent Application, First Publication No. H04-170336: hereinafter referred to as Patent Document 1) of stopping the introduction of oxygen in the return period; and a method (for example, see Japanese Unexamined Patent Application, First Publication No. H04-175239: hereinafter referred to as Patent Document 2) of supplying a purge gas into an oxygen nozzle in the return period.

In order to prevent the deterioration of the tip of the oxygen nozzle, for example, the following methods have been proposed: a method (for example, see Japanese Unexamined Patent Application, First Publication No. H11-79774: hereinafter referred to as Patent Document 3) of using a mixed gas of hydrogen and inert gas or nitrogen; a method (for example, see Japanese Unexamined Patent Application, First Publication No. H06-247722: hereinafter referred to as Patent Document 4) which reduces the thickness of a nozzle to 1 mm or less to increase the flow rate of gas; and a method (for example, see Japanese Unexamined Patent Application, First Publication No. S59-232933: hereinafter referred to as Patent Document 5) in which a sealing layer is provided on the periphery of an oxygen gas nozzle.

In the above-mentioned Patent Documents, oxygen corresponds to "supporting gas", hydrogen corresponds to "combustion gas", and inert gas or nitrogen corresponds to "purge gas".

However, in the methods disclosed in Patent Document 1 and Patent Document 2, at the moment when the flow rate of gas is changed, that is, the flow rate of gas is reduced, the nozzle temporarily becomes a high temperature, and reiteration of this may cause deformation of the nozzle.

In the method disclosed in Patent Document 3, since deposition efficiency is greatly affected by manufacturing conditions, preferable results may not be achieved.

In the method disclosed in Patent Document 4, since the flow rate of gas is reduced during ignition, extinguishment, a pilot light, and the like, the nozzle glows. Further, when the thickness of the nozzle is equal to or less than 1 mm, the deformation of the nozzle due to the glow becomes significant, and thereby reducing the lifespan of the nozzle.

In the method disclosed in Patent Document 5, the deformation of the nozzle can be prevented, but the size of the burner increases and the structure of the burner becomes complicated since the sealing layer is provided, which is not preferable. In addition, the manufacturing accuracy of the burner is reduced, or deposition efficiency is reduced since the burner is excessively large.

The present invention has been made in view of the above-mentioned problems and a first object of the present invention is to provide a method for manufacturing an optical fiber preform using a flaming burner used for generating glass particles which is capable of preventing the deterioration of a nozzle tip due to glow without a reduction in deposition efficiency and is capable of effectively preventing the deterioration of the nozzle tip particularly when a mode change between the deposition mode and the non-deposition mode (pilot light state) is frequently reiterated.

A second object of the present invention is to provide an apparatus for manufacturing an optical fiber preform including a flaming burner used for generating glass particles, the apparatus having a simple structure being capable of preventing the deterioration of a nozzle tip due to glow, and being capable of increasing the lifespan of a burner even when a mode change between the deposition mode and the non-deposition mode (pilot light state) is frequently reiterated.

SUMMARY OF THE INVENTION

A method for manufacturing an optical fiber preform according to a first aspect of the present invention, includes using a combustion burner including a glass source material gas discharge nozzle and two combustion gas ports that are adjacent to each other and are arranged in the vicinity of the glass source material gas discharge nozzle, the two combustion gas ports including: a combustion gas port A which includes a plurality of supporting gas discharge nozzles with a small diameter arranged so as to be close to the glass source material gas discharge nozzle; and a combustion gas port B which does not include the supporting gas discharge nozzle, burning a mixed gas including a glass source material gas from the glass source material gas discharge nozzle, a combustion gas from the combustion gas ports, and a supporting gas from the supporting gas discharge nozzle to deposit glass particles on a periphery of a target member, and at least one of: a step $\alpha$ of, when a mode is changed from a deposition mode in which the glass particles are deposited on the periphery of the target member to a non-deposition mode in which the glass particles are not deposited on the periphery of the target member, changing a gas discharged from the combustion gas port A from the combustion gas to a purge gas, while maintaining a pilot light of the combustion burner with the combustion gas from the combustion gas port B and maintaining a flow rate of the supporting gas discharged from the supporting gas discharge nozzles of the combustion gas port A to be equal to or greater than a flow rate at which a nozzle tip of the supporting gas discharge nozzles does not glow; and a step $\beta$ of when the mode is changed from the non-deposition mode in which the glass particles are not deposited on the periphery of the target member to the deposition mode in which the glass particles are deposited on the periphery of the target member, changing a gas discharged from the combustion gas port A from a purge gas to the combustion gas, while maintaining a pilot light of the combustion burner with the combustion gas from the combustion gas port B and maintaining the flow rate of the supporting gas discharged from the supporting gas discharge nozzles of the combustion gas port A to be equal to or greater than the flow rate at which the nozzle tip of the supporting gas discharge nozzles does not glow.

It may be arranged such that the above-described method includes the step $\alpha$, and after the gas is changed from the combustion gas to the purge gas, the flow rate of the supporting gas is maintained or reduced, the discharge of the supporting gas from the supporting gas discharge nozzle is stopped, or the gas discharged from the supporting gas discharge nozzle is changed from the supporting gas to a purge gas.

It may be arranged such that the method includes the step $\beta$, and before the step $\beta$, the flow rate of the supporting gas is maintained or increased, the discharge of the supporting gas from the supporting gas discharge nozzle starts, or the gas discharged from the supporting gas discharge nozzle is changed from a purge gas to the supporting gas.

It may be arranged such that the above-described method comprises the step $\alpha$ and the step $\beta$.

An apparatus for manufacturing an optical fiber preform according to a second aspect of the present invention includes: a combustion burner that includes a glass source material gas discharge nozzle and two combustion gas ports which are adjacent to each other and are arranged in the vicinity of the glass source material gas discharge nozzle, the two combustion gas ports including: a combustion gas port A which includes a plurality of supporting gas discharge nozzles with a small diameter arranged so as to be close to the glass source material gas discharge nozzle; and a combustion gas port B which does not include the supporting gas discharge nozzle, the combustion burner burning a mixed gas including a glass source material gas from the glass source material gas discharge nozzle, a combustion gas from the combustion gas ports, and a supporting gas from the supporting gas discharge nozzles to deposit glass particles on a periphery of a target member; and a gas change mechanism that, when a mode is changed between a deposition mode in which the glass particles are deposited on the periphery of the target member and a non-deposition mode in which the glass particles are not deposited on the periphery of the target member, changes a gas discharged from the combustion gas port A from the combustion gas to a purge gas or from a purge gas to the combustion gas, while maintaining a pilot light of the combustion burner with the combustion gas from the combustion gas port B and maintaining a flow rate of the supporting gas discharged from the supporting gas discharge nozzles of the combustion gas port A to be equal to or greater than a flow rate at which a nozzle tip of the supporting gas discharge nozzles does not glow.

It may be arranged such that the glass source material gas discharge nozzle is disposed at the center of the combustion burner, and the combustion gas port A and the combustion gas port B are disposed outside the glass source material gas discharge nozzle so as to be concentric with the glass source material gas discharge nozzle.

The method for manufacturing an optical fiber preform according to the first aspect of the present invention includes the step $\alpha$ of, when the mode is changed from the deposition mode in which the glass particles are deposited on the periphery of the target member to the non-deposition mode in which the glass particles are not deposited on the periphery of the target member, changing a gas discharged from the combustion gas port A from the combustion gas to a purge gas, while maintaining the pilot light of the combustion burner with the combustion gas from the combustion gas port B and maintaining the flow rate of the supporting gas discharged from the supporting gas discharge nozzles of the combustion gas port A to be equal to or greater than the flow rate at which a nozzle tip of the supporting gas discharge nozzles does not glow and the step $\beta$ of, when the mode is changed from the non-deposition mode in which the glass particles are not deposited on the periphery of the target member to the deposition mode in which the glass particles are deposited on the periphery of the target member, changing a gas discharged from the combustion gas port A from a purge gas to the combustion gas, while maintaining the pilot light of the combustion burner with the combustion gas from the combustion gas port B and maintaining the flow rate of the supporting gas discharged from the supporting gas discharge nozzles of the combustion gas port A to be equal to or greater than the flow rate at which the nozzle tip of the supporting gas discharge nozzles does not glow.

When the method for manufacturing an optical fiber preform includes the step $\alpha$, during a mode change from the deposition mode to the non-deposition mode, the flow rate of the supporting gas discharged from the supporting gas discharge nozzles of the combustion gas port A is maintained to be equal to or greater than the flow rate at which the nozzle tip of the supporting gas discharge nozzles does not glow. Therefore, even when the flow rate of the combustion gas from the combustion gas port A is reduced to some extent, the nozzle tip does not glow. When the gas discharged from the combustion gas port A is changed from the combustion gas to the purge gas, combustion does not occur, and thereby preventing the nozzle tip from being heated to a high temperature. That is, it is possible to prevent the nozzle tip from being heated to a high temperature. After the gas discharged from the combustion gas port A is changed from the combustion gas to the purge gas, the flow rate of the supporting gas is maintained or reduced, the discharge of the supporting gas from the supporting gas discharge nozzle is stopped, or the gas discharged from the supporting gas discharge nozzle is changed from the supporting gas to the purge gas. In this case, it is possible to reliably prevent the nozzle tip from being heated to a high temperature.

In addition, the pilot light of the combustion burner is maintained by the combustion gas port B. Therefore, when the mode is changed from the non-deposition mode to the deposition mode later, it is possible to reliably and rapidly perform ignition. Therefore, it is possible to prevent a reduction in deposition efficiency.

As described above, in the above-mentioned aspect of the present invention, it is possible to provide a method for manufacturing an optical fiber preform capable of preventing the deterioration of the nozzle tip due to glow without a reduction in deposition efficiency, particularly, capable of effectively preventing the deterioration of the nozzle tip when a mode change from the deposition mode to the non-deposition mode (pilot light state) is frequently reiterated.

After the step α, an "extinguished state" may be provided. That is, the state may be changed from the "pilot light state" in the step α, to the "extinguished state".

When the method for manufacturing an optical fiber preform includes the step β, if the gas discharged from the combustion gas port A is changed from the combustion gas to the purge gas, combustion does not occur. Therefore, the nozzle tip is not heated to a high temperature. When the mode is changed from the non-deposition mode to the deposition mode, the flow rate of the supporting gas discharged from the supporting gas discharge nozzles of the combustion gas port A is maintained to be equal to or greater than the flow rate at which the nozzle tip of the supporting gas discharge nozzles does not glow. Therefore, even when the flow rate of the combustion gas from the combustion gas port A is reduced to some extent, the nozzle tip does not glow. That is, it is possible to prevent the nozzle tip from being heated to a high temperature. Before the step β, the flow rate of the supporting gas is maintained or increased, the discharge of the supporting gas from the supporting gas discharge nozzle starts, or the gas discharged from the supporting gas discharge nozzle is changed from the purge gas to the supporting gas. In this case, it is possible to reliably prevent the nozzle tip from being heated to a high temperature.

In addition, the pilot light of the combustion burner is maintained by the combustion gas port B. Therefore, when the mode is changed from the non-deposition mode to the deposition mode later, it is possible to reliably and rapidly perform ignition. Therefore, it is possible to prevent a reduction in deposition efficiency.

As described above, in the above-mentioned aspect of the present invention, it is possible to provide a method for manufacturing an optical fiber preform capable of preventing the deterioration of the nozzle tip due to glow without a reduction in deposition efficiency, particularly, capable of effectively preventing the deterioration of the nozzle tip when a mode change from the non-deposition mode (pilot light state) to the deposition mode is frequently reiterated.

Before the step β, the "extinguished state" may be provided. That is, the state may be changed from the "extinguished state" to the "pilot light state", which is the step β.

The apparatus for manufacturing an optical fiber preform according to the second aspect of the present invention includes a gas change mechanism that, when the mode is changed between the deposition mode and the non-deposition mode, changes a gas discharged from the combustion gas port A from the combustion gas to a purge gas or from a purge gas to the combustion gas, while maintaining the pilot light of the combustion burner with the combustion gas from the combustion gas port B and maintaining the flow rate of the supporting gas discharged from the supporting gas discharge nozzles of the combustion gas port A to be equal to or greater than the flow rate at which the nozzle tip of the supporting gas discharge nozzles does not glow.

For example, when the mode is changed from the deposition mode to the non-deposition mode, the flow rate of the supporting gas discharged from the supporting gas discharge nozzles of the combustion gas port A is maintained to be equal to or greater than the flow rate at which the nozzle tip of the supporting gas discharge nozzles does not glow. Therefore, even when the flow rate of the combustion gas from the combustion gas port A is reduced to some extent, the nozzle tip does not glow. When the gas discharged from the combustion gas port A is changed from the combustion gas to the purge gas, combustion does not occur, and thereby preventing the nozzle tip from being not heated to a high temperature. Thereafter, the discharge of the supporting gas is stopped or the gas is changed from the supporting gas to the purge gas to prevent the nozzle tip from being heated to a high temperature. Therefore, the apparatus for manufacturing an optical fiber preform according to the aspect of the present invention can prevent the nozzle tip of the burner from glowing. In addition, when the mode is changed from the non-deposition mode to the deposition mode, the same function and effect as described above can be obtained.

As described above, according to the aspect of the present invention, it is possible to provide an apparatus for manufacturing an optical fiber preform that includes a flaming burner used for generating glass particles, which is capable of preventing the deterioration of a nozzle tip due to glow and increasing the lifespan of the burner with a simple structure.

In the present invention, the "purge gas" means a gas which is used as an alternative for a specific gas and exhibits relatively low reactivity. Specifically, examples of the purge gas include nitrogen gas and inert gases, such as helium, neon, or argon.

DESCRIPTION OF THE PREFERRED EMBODIMENTS

Hereinafter, exemplary embodiments of the present invention will be described.

Figure 1:
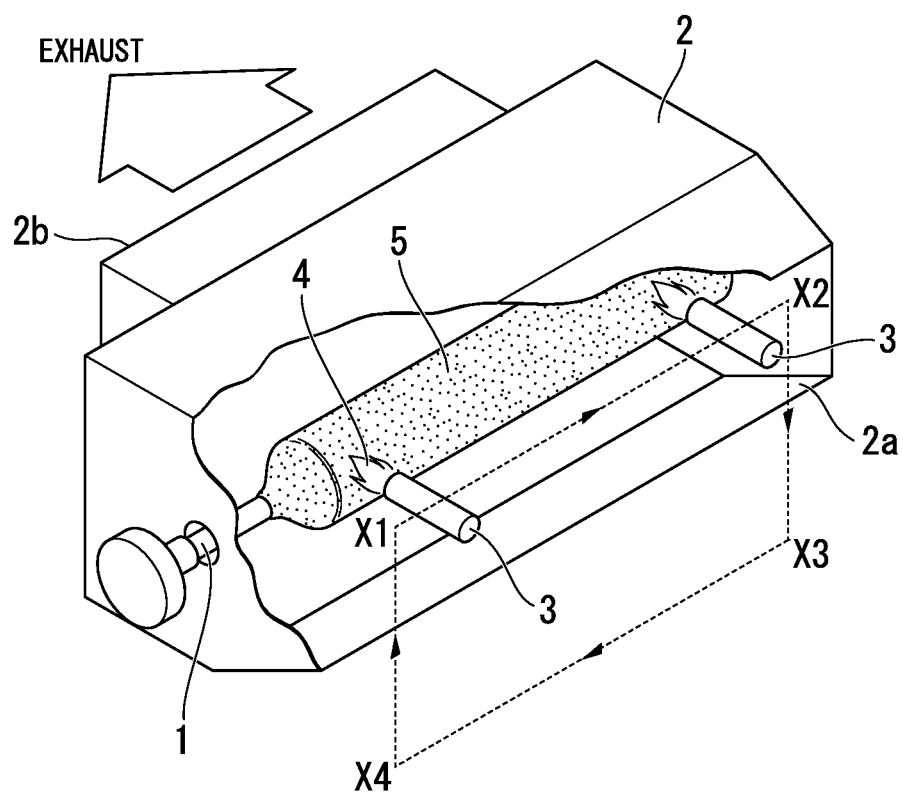
FIG. 1 is a schematic view illustrating an example of a manufacturing apparatus system used in a method for manufacturing an optical fiber preform.
Figure 2:
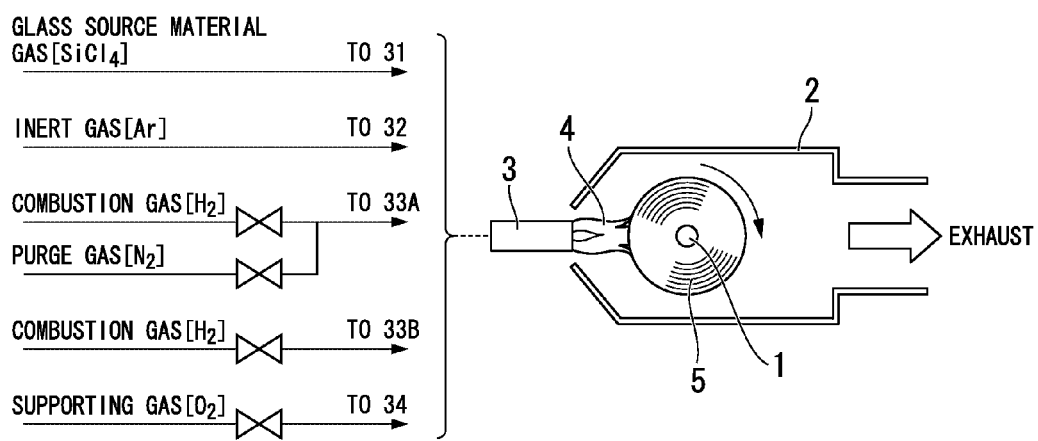
FIG. 2 is a schematic view illustrating an example of the manufacturing apparatus system used in the method for manufacturing the optical fiber preform.

FIGS. 1 and 2 are schematic views illustrating an example of a manufacturing apparatus system which is used in a method for manufacturing an optical fiber preform according to an embodiment of the present invention.

In FIGS. 1 and 2, reference numeral 1 indicates a target member which is accommodated in a chamber 2 such that both ends thereof are rotatably supported by, for example, a glass lathe. The target member 1 is a rod-shaped member which is removed in the subsequent process, serves as a core of the optical fiber preform, or serves as a portion of a core and a cladding surrounding the core.

The chamber 2 rectifies the flow of flames and glass particles and protects a glass particle deposition layer.

An opening portion 2a is provided in one of the side wall (the lower right side in FIG. 1) of the chamber 2 along the axis direction of the target member 1 which is provided in the chamber 2. In addition, an exhaust portion 2b is provided in the opposite side wall (the upper left side in FIG. 1) through which, for example, combustion gas is exhausted.

A combustion burner 3 for glass particle synthesis is provided in the opening portion 2a of the chamber 2. The combustion burner 3 traverses and circulates through sections (X1→X2→X3→X4→X1) shown in the figure by an external traverse device (not shown).

Hereinafter, the combustion burner 3 (for example, FIG. 3) including a multiunit tube structure will be described. However, the method for manufacturing the optical fiber preform according to the present invention is not limited to the structure shown in FIG. 3 (a structure in which, for example, glass source material gas discharge nozzles and inert gas discharge nozzles are concentrically arranged). The nozzles (for example, the glass source material gas discharge nozzles and the inert gas discharge nozzles) of the combustion burner 3 having the multiunit tube structure are arranged so as to be "adjacent" or "close" to each other, in terms of the thickness level of the tube.

Figure 3:
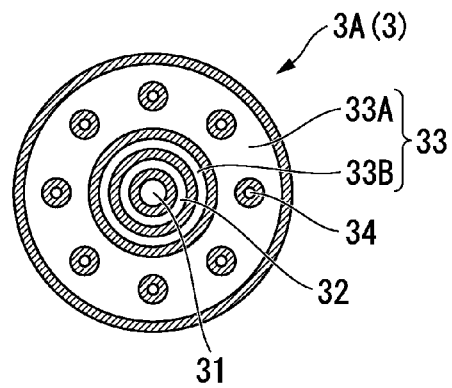
FIG. 3 is a view illustrating an example of a nozzle portion of a combustion burner, as viewed from the tip side.

In addition to the multiunit tube structure shown in FIG. 3, for example, the following structure may be used: at least two or more adjacent combustion gas ports and inert gas discharge nozzles are independently arranged in the "vicinity" of the glass source material gas discharge nozzle. In this structure, at least one of the combustion gas ports may include a supporting gas discharge nozzle which is arranged so as to be "close" to the glass source material gas discharge nozzle. The term "adjacent" or "close" means that the distance is so short that the nozzle tip of the combustion burner can glow in a "pilot light state".

FIG. 3 is a view illustrating an example of a nozzle portion of the combustion burner 3 used in the manufacturing apparatus, as viewed from the tip side.

The combustion burner 3A (3) includes a glass source material gas discharge nozzle 31 which is arranged at the center, an inert gas discharge nozzle 32 which is arranged outside the glass source material gas discharge nozzle 31, and at least two or more adjacent combustion gas ports 33 which are concentrically arranged outside the inert gas discharge nozzle 32.

The combustion gas ports 33 include at least one combustion gas port 33A which is arranged concentrically with the glass source material gas discharge nozzle 31 and includes a plurality of supporting gas discharge nozzles 34 with a small diameter.

The combustion gas ports 33 also include at least one combustion gas port 33B which does not include the supporting gas discharge nozzle 34.

Combustion gas (in the present embodiment, $H_2$ gas), supporting gas ($O_2$ gas), glass source material gas ($SiCl_4$), inert gas (for example, Ar gas), and purge gas ($N_2$ gas) are supplied from various gas supply sources (not shown) to the combustion burner 3 having the above-described nozzle structure through various gas supply tubes.

Specifically, the glass source material gas ($SiCl_4$) is supplied to the glass source material gas discharge nozzle 31. In addition, the glass source material gas and the supporting gas and/or the combustion gas may be supplied to the glass source material gas discharge nozzle 31. In this way, it is possible to prevent the extinguishment of a pilot light.

The inert gas (for example, Ar gas) is supplied to the inert gas discharge nozzle 32. The inert gas used herein is also referred to as a sealing gas.

The inert gas discharge nozzle 32 is provided in order to prevent the reaction product of the source material from being deposited on the tip of the glass source material gas discharge nozzle 31 and is not indispensable in the present invention.

As shown on the left side of FIG. 2, each of the above-mentioned gases is appropriately introduced into the combustion burner 3. For example, in the combustion burner 3 shown in FIG. 3, the combustion gas ($H_2$ gas) or the purge gas ($N_2$ gas) is supplied to the combustion gas port 33A. In addition, the combustion gas ($H_2$ gas) is supplied to the combustion gas port 33B.

For example, a combustion gas tube and a purge gas tube are in parallel with each other and are connected to the combustion gas supply tube which is connected to the combustion gas port 33A. Valves provided in the combustion gas tube and the purge gas tube are opened or closed to perform switching between the combustion gas and the purge gas and control the flow rate of the gases. The tube structure is not limited thereto, but any tube structure may be used as long as it has a function of performing switching between the combustion gas and the purge gas. For example, a structure using a three-way valve may be used.

The supporting gas ($O_2$ gas) is supplied to the supporting gas discharge nozzle 34.

An apparatus for manufacturing the optical fiber preform according to the present embodiment includes a gas change mechanism which, when the mode is changed from a deposition mode in which glass particles are deposited on the periphery of a target member to a non-deposition mode in which the glass particles are not deposited, changes a gas discharged from the combustion gas port 33A from the combustion gas to the purge gas while maintaining the pilot light of the combustion burner 3 with the combustion gas from the combustion gas port 33B and maintaining the flow rate of the supporting gas discharged from the supporting gas discharge nozzle 34 of the combustion gas port 33A to be equal to or more than a flow rate at which the nozzle tip of the supporting gas discharge nozzle 34 does not glow, which will be described in detail below. After the change operation, the gas change mechanism can maintain or reduce the flow rate of the supporting gas, stop the discharge of the supporting gas, or change the gas discharged from the supporting gas discharge nozzle 34 from the supporting gas to the purge gas. Even when the mode is changed from the non-deposition mode to the deposition mode, the gas change mechanism changes the discharge gas from the supporting gas discharge nozzle and each combustion gas port.

With the above-described apparatus system, a glass particle deposition layer 5 can be formed on the periphery of the target member 1 to obtain a glass particle deposited body by performing traverse in the axis direction of a rotating target member plural times from one direction.

Specifically, first, the target member 1 is rotated and the combustion burner 3 facing the outer circumference of the target member 1 is traversed from a point (deposition start position) X1 to a point (deposition completion position) X2 in FIG. 1 while performing combustion by the combustion burner 3.

In the section X1→X2 corresponding to the deposition process (deposition mode) of the combustion burner 3, a valve 6 and a valve 7 provided in the combustion burner is operated to supply the combustion gas, the supporting gas, the glass source material gas, and the inert gas and glass particles are generated in a flame 4 by a flame hydrolysis reaction. The glass particles generated in the flame 4 are attached and deposited onto the outer circumference of the target member 1 to form the glass particle deposition layer 5.

When the combustion burner 3 reaches the deposition completion position X2 and the deposition process ends, the combustion burner 3 is driven by the external traverse device to be moved in a section from the point X2 to the deposition start position X1 through points X3 and X4. In the section, the combustion burner 3 is in a return process (non-deposition mode).

The combustion burner 3 is moved back from the point X2. That is, the combustion burner 3 is moved back from the target member 1 and the opening portion 2a of the chamber 2 and falls to the point X3. Then, the combustion burner 3 is moved to the left side of FIG. 1, that is, from the point X3 to the point X4 so as not to come into contact with the other burners. When reaching the point X4 at the left end of FIG. 1, the combustion burner 3 is lifted towards X1, enters the chamber 5, and is moved from the point X1 to the point X2 again.

When the traverse circulation is performed plural times, the glass particles are gradually deposited and grown and the glass particle deposition layer 5 is obtained. As a result, a glass particle deposited body with a desired diameter is obtained.

The present invention is not limited to the above-mentioned "circulation method", but a "reciprocation method" may be used. As an example of the "reciprocation method", the following method may be used: similarly to the circulation method, the combustion burner 3 traverses the section X1→X2, goes into a pilot light state after reaching the point X2, and is traversed to the point X1; the pilot light of the combustion burner 3 is changed to a flame corresponding to the deposition mode after the combustion burner 3 reaches the point X1; and the operation for the section X1→X2 is performed again. The target member and the combustion burner may be moved relative to each other. That is, one of the target member and the combustion burner may be fixed and the other may be moved. Alternatively, both the target member and the combustion burner may be moved.

As another example of the "reciprocation method", the traverse sections X2-X3 and X4-X1 corresponding to the non-deposition mode may be provided on both sides of the traverse section X1-X2 corresponding to the deposition mode. In this configuration the combustion burner is moved, for example, in the order of "X1→X2→X3→X2→X1→X4→X1→X2→X3→X2 . . . ". This configuration is particularly effective in a case in which two or more burners form one unit and each unit of the combustion burners is driven. That is, according to this configuration, it is possible to individually change the combustion burners in the unit to the non-deposition mode.

A method including reiteration of the above-described operation is defined as the "reciprocation method" in the specification.

The formed glass particle deposited body, which is a porous body formed as described above, is taken out from the chamber 2 and a heat treatment is performed on the glass particle deposited body in a high-temperature heating furnace. Then, the glass particle deposited body is changed into transparent glass and a desired optical fiber preform is obtained.

In particular, the method for manufacturing the optical fiber preform according to the present embodiment includes a step α which, when the mode is changed from the deposition mode (the section X1→X2) in which the glass particles are deposited on the periphery of the target member to the non-deposition mode (the return mode; a section X2→X3→X4→X1) in which the glass particles are not deposited in the traverse circulation of the combustion burner 3, changes the gas discharged from the combustion gas port A from the combustion gas to the purge gas while maintaining the pilot light of the combustion burner 3 with the combustion gas from the combustion gas port 33B and maintaining the flow rate of the supporting gas discharged from the supporting gas discharge nozzles of the combustion gas port 33A to be equal to or greater than a flow rate at which the nozzle tip of the supporting gas discharge nozzles does not glow. After the gas is changed from the combustion gas to the purge gas, the flow rate of the supporting gas may be maintained or reduced, the discharge of the supporting gas may be stopped, or the gas discharged from the supporting gas discharge nozzle 34 may be changed from the supporting gas to the purge gas.

Figure 4:
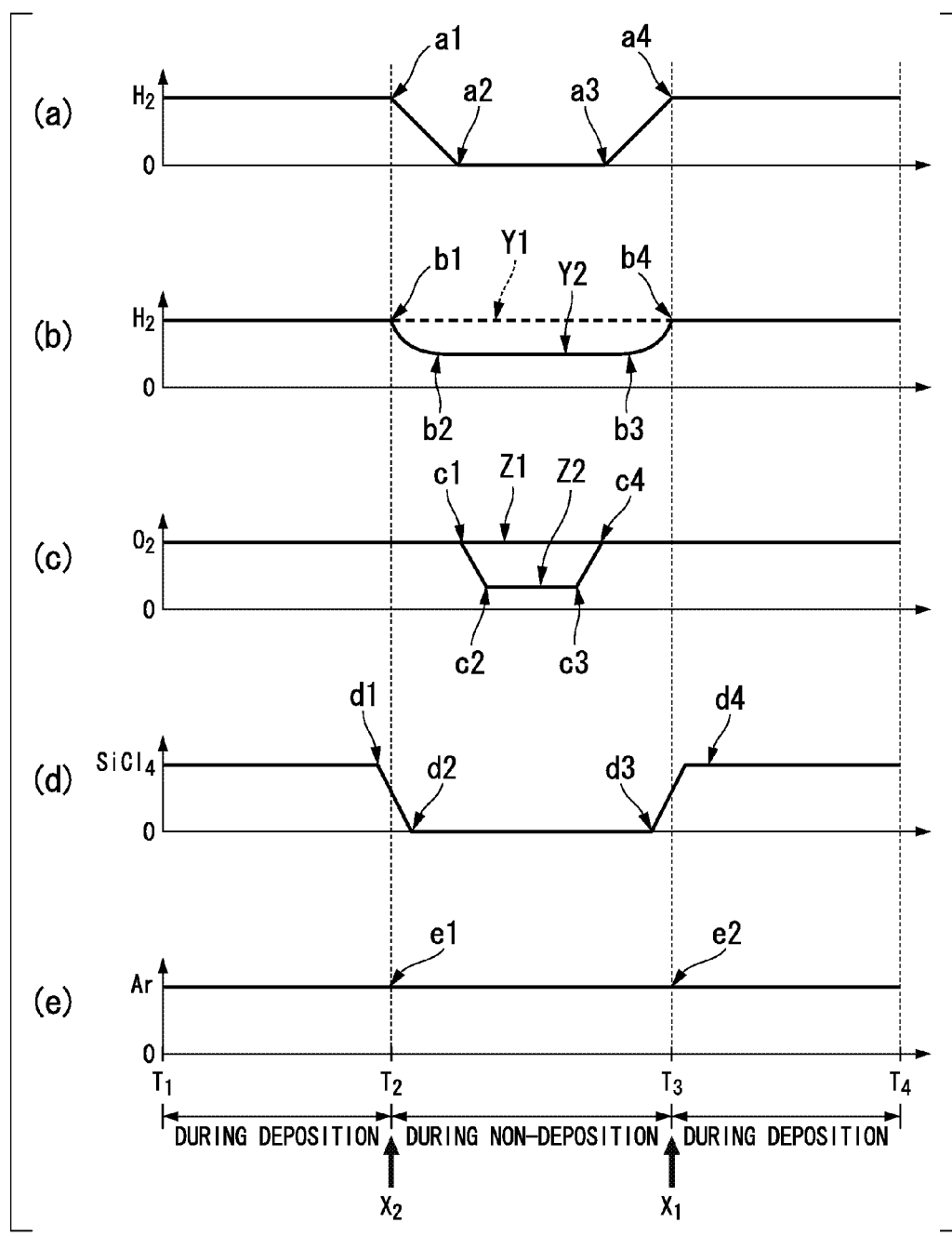
FIG. 4 is a view illustrating the flow rate of various kinds of gas supplied to the combustion burner in the traverse circulation of the combustion burner.

FIG. 4 schematically illustrates the flow rates of various kinds of gas supplied to the combustion burner 3 during the traverse circulation of the combustion burner 3, in the present embodiment. In (a) to (e) of FIG. 4, the horizontal axis is a common time axis. A period between a time T1 and a time T2 indicates a first deposition mode (represented by "during deposition" in FIG. 4), a period between the time T2 and a time T3 indicates the non-deposition mode (represented by "during non-deposition" in the figure), and a period between the time T3 and a time T4 indicates a second deposition mode (represented by "during deposition" in the figure). The time T2 corresponds to the point X2 in FIG. 1 and the time T3 corresponds to the point X1 in FIG. 1.

In the graphs shown in FIG. 4, the vertical axis indicates the flow rate of the combustion gas ($H_2$ gas) supplied to the combustion gas port 33A in (a), the flow rate of the combustion gas ($H_2$ gas) supplied to the combustion gas port 33B in (b), the flow rate of the supporting gas ($O_2$ gas) supplied to the supporting gas discharge nozzle 34 in (c), the flow rate of the glass source material gas ($SiCl_4$) supplied to the glass source material gas discharge nozzle 31 in (d), and the flow rate of the inert gas (for example, Ar gas) supplied to the inert gas discharge nozzle 32 in (e).

In (a) of FIG. 4, reference numeral a1 indicates that the flow of gas at the time T2 is cut off, reference numeral a2 indicates that the flow rate of gas reaches zero, reference numeral a3 indicates that the flow of gas restarts, and reference numeral a4 indicates that the flow of gas is resumed at the time T3.

As shown in (b) of FIG. 4, the flow rate of the combustion gas supplied to the combustion gas port 33B when glass particles are not deposited is controlled to a level Y2 lower than a level Y1 in during deposition (b1→b2→b3→b4). The control operation is not indispensable, but is preferable since fire power is reduced as the flow rate of the combustion gas is reduced during non-deposition.

In particular, a change "a1→a2" in (a) of FIG. 4 means that the supply of the combustion gas to the combustion gas port 33A is stopped and the purge gas starts to flow to the combustion gas port 33A at a time "a2". At substantially the same time, as shown in (b) of FIG. 4, the flow rate of the combustion gas supplied to the combustion gas port 33B is reduced to a level capable of maintaining combustion (Y1→Y2). In the supporting gas port 34 shown in (c) of FIG. 4, "c1" is substantially the same time as "a2" in (a) of FIG. 4. Therefore, even when a change "c1→c2" shown in (c) of FIG. 4 is made, that is, even when the flow rate of the supporting gas is reduced, the tip of the nozzle 34 does not glow due to the effect of the purge gas.

The point to be noted in the control of the flow rate of the supporting gas is that the time when the flow rate is reduced from "c1", the supply of the supporting gas is stopped, or the gas is changed from the supporting gas to the purge gas is set after the time "a2". That is, it is important that the purge gas flows to the port 33A at the time when the flow rate of the supporting gas is controlled. It does not matter whether the flow rate of gas to the port 33B is Y1 or Y2.

That is, as shown in (c) of FIG. 4, the flow rate of the supporting gas supplied to the supporting gas discharge nozzle 34 is controlled to be equal to a level Z1 or it is controlled to a level Z2 lower than the level Z1, when glass particles are not deposited. In addition, although not shown in the drawings, the supply of the supporting gas may be completely stopped, or the gas may be changed from the supporting gas to the purge gas.

As shown in (d) of FIG. 4, the flow rate of the glass source material gas supplied to the glass source material gas discharge nozzle 31 decreases over the time T2 (d1→d2) and increases over the time T3 (d3→d4). In the example shown in (d) of FIG. 4, at the times T2 and T3, the flow rate of the glass source material gas is half the flow rate during deposition. The increase and decrease profile shown in FIG. 4 shows an example in which the change time between the deposition mode and the non-deposition mode and the change time of the combustion gas are intentionally "shifted".

When the two times are synchronized, two different kinds of gas are instantaneously mixed with each other and an unstable situation which is three-dimensionally disordered is likely to occur. That is, it may become difficult to control the flames. In contrast, as shown in (d) of FIG. 4, when the two times are intentionally shifted, the switching of the combustion gas is performed at a constant time interval. Therefore, it is easy to ensure a stable flame state and controllability is improved. That is, it is possible to maintain a state where a high-temperature portion of the combustion gas is stably positioned away from the nozzle tip, and thus preventing the nozzle tip from being high temperature. That is, there is no chance for the nozzle tip to be heated to a high-temperature, which is preferable.

As shown in (e) of FIG. 4, the flow rate of the inert gas supplied to the inert gas discharge nozzle 32 may be maintained constant even at boundaries (e1 and e2) between deposition and non-deposition.

The present invention uses the following principle.

(1) The tip of the supporting gas nozzle glows at the combustion gas port 33A when the flow rate of the combustion gas and the supporting gas is too low.

When the flow rate of the combustion gas and the supporting gas is low, the combustion gas and the supporting gas are burned in the vicinity of the nozzle tip and the nozzle tip is heated to a high temperature. Therefore, in order to prevent the tip of the supporting gas nozzle from glowing, the flow rate of the combustion gas or the supporting gas may need to be higher.

Figure 5:
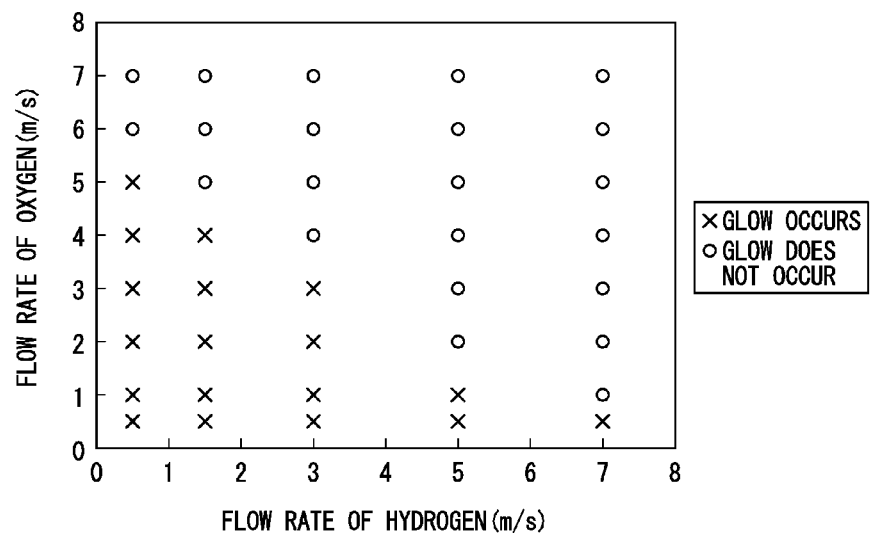
FIG. 5 is a view illustrating results of the visual observation of the glow state of a nozzle tip when combustion gas and supporting gas are burned while the average flow rate of those gases is changed.

In order to investigate the relationship between the average flow rate of the combustion gas ($H_2$ gas) and the supporting gas ($O_2$ gas) and the glowing state of the supporting gas nozzle tip using a multi-nozzle-type burner having the nozzle structure shown in FIG. 3, the combustion gas ($H_2$ gas) and the supporting gas ($O_2$ gas) were burned while the flow rates thereof were changed. FIG. 5 is a view illustrating the results of visual observation of the glowing state of the supporting gas nozzle tip in this case.

As can be seen from FIG. 5, when the flow rate of the $O_2$ gas is constant and the flow rate of the $H_2$ gas is reduced, glow occurs. When the flow rate of the $O_2$ gas is high, glow does not occur even when the flow rate of the $H_2$ gas is reduced to some extent.

As a result, in the multi-nozzle-type burner, when an oxygen flow rate is, for example, equal to or greater than 6 [m/sec], glow is not observed and it is clear that the problem of the lifespan of the combustion burner being reduced is solved. The experimental result is an illustrative example and the present invention is not limited to the value.

(2) With the supporting gas or the combustion gas replaced with the purge gas, combustion does not occur and the supporting gas nozzle tip is not heated to a high temperature.

A gas having a low fire supporting property may be used as a purge gas for purging the supporting gas and a gas having a low flammability may be used as a purge gas for purging the flaming gas. For example, an inert gas, a nitrogen gas, or the like is preferably used in terms of ease in handling.

In the combustion burner 3 with the nozzle structure shown in FIG. 3, the combustion gas was fed to the combustion gas port 33B to maintain the pilot light. On the other hand, in the combustion gas port 33A, with nitrogen flowing to the combustion gas port 33A around the supporting gas nozzle, the supporting gas was fed to the supporting gas nozzle while the flow rate thereof was changed from 0 m/sec to 8 m/sec, and the glow of the oxygen nozzle tip was visually examined. As a result, the glow of the nozzle was not observed. In addition, nitrogen was fed to the supporting gas nozzle while the flow rate thereof was changed from 0 m/sec to 8 m/sec. As a result, the glow of the nozzle was not observed.

(3) The flame only with a combustion gas is likely to be extinguished, but the flame with a mixture of the combustion gas and the supporting gas is less likely to be extinguished.

In the present embodiment, the state is shifted to the state (2) while maintaining the state (1) and then the flow rate of the supporting gas is reduced. Therefore, there is no chance for the nozzle tip to be heated to a high temperature. The nozzle tip is not heated to a high temperature even in the state (1) and the state (2) in which the flow rate of the combustion gas is reduced, and even when the flow rate of the supporting gas is reduced after the state (2).

That is, in the present embodiment, when the mode is changed from the deposition mode to the non-deposition mode, the flow rate of the supporting gas discharged from the supporting gas discharge nozzle of the combustion gas port 33A is maintained to be equal to or greater than a flow rate at which the nozzle tip does not glow. Therefore, even when the flow rate of the combustion gas is reduced to some extent, the nozzle tip does not glow. When the gas discharged from the combustion gas port A is changed from the combustion gas to the purge gas, combustion does not occur and the nozzle tip is not heated to a high temperature. Thereafter, the supply of the supporting gas is stopped or the gas discharged from the supporting gas discharge nozzle is changed from the supporting gas to the purge gas. Therefore, there is no chance for the nozzle tip to be heated to a high temperature. Even when the flow rate of the combustion gas is reduced and then the flow rate of the supporting gas is reduced, the nozzle tip is not heated to a high temperature.

In addition, the pilot light of the combustion burner 3 is maintained by the combustion gas port 33B. Therefore, when the mode is changed from the non-deposition mode to the deposition mode (step β), it is possible to reliably and rapidly ignite the combustion burner. Therefore, it is possible to prevent a reduction in deposition efficiency.

As described above, in the present embodiment, it is possible to prevent the deterioration of the nozzle tip due to glow, without a reduction in deposition efficiency. In particular, it is possible to effectively prevent the deterioration of the nozzle tip when a mode change from the deposition mode to the non-deposition mode (pilot light state) is frequently reiterated.

After the step α, a step of stopping the supply of the combustion gas to the combustion gas port 33B to extinguish the flame of the combustion burner 3 may be performed.

In this case, it is possible to rapidly and naturally extinguish the flame of the combustion burner 3 by stopping the supply of the combustion gas to the combustion gas port 33B.

When the combustion burner 3 returns to the deposition start position X1 and the mode is changed from the non-deposition mode to the deposition mode, the combustion gas is supplied to the combustion gas port 33B to ignite the combustion burner. Then, the supporting gas flows from the supporting gas discharge nozzle 34 of the combustion gas port 33A at a flow rate equal to or greater than a flow rate at which the nozzle tip of the supporting gas discharge nozzle 34 does not glow, and the supply of the combustion gas starts to start combustion (step β).

That is, with the purge gas flowing to the combustion gas port 33A, the combustion gas discharged from the combustion gas port 33B is ignited. Specifically, the combustion gas is ignited while the purge gas flows to the combustion gas port 33A and the combustion gas flows to the combustion gas port 33B. At that time, after the flow rate of the supporting gas increases to a predetermined value or more, the purge gas in the combustion gas port 33A is changed to the combustion gas.

In the present embodiment, in the combustion burner 3, two combustion gas ports 33 (the combustion gas port 33A and the combustion gas port 33B) are arranged adjacent to each other.

In a case where the two combustion gas ports 33 are adjacent to each other and a pilot light is maintained by the combustion gas from one of the two combustion ports, feeding the combustion gas to the other adjacent combustion gas port 33 makes it possible reliably and naturally ignite the combustion gas. That is, it is preferable that the combustion gas ports 33 be adjacent to each other in order to reduce the possibility of ignition failure.

In the combustion burner 3 with the nozzle structure shown in FIG. 3, the combustion gas was maintained in a pilot light state at the central combustion gas port 33B, the supporting gas ($O_2$ gas) was fed to the supporting gas nozzle of the combustion gas port 33A at a flow rate of 6 [m/sec], and the inert gas ($N_2$ gas) was fed to the combustion gas port 33A. In this state, the gas was changed from the inert gas to the combustion gas ($H_2$ gas). As a result, the combustion gas was ignited without any problem.

The same method was tested using a burner including two combustion gas ports which were not adjacent to each other, and the test revealed that ignition failure was observed in some cases.

As described above, according to the present embodiment, when the mode is changed from the deposition mode to the non-deposition mode (extinguishment), the nozzle is not heated to a high temperature and is not deformed even when the fire power of the combustion burner is reduced. Therefore, the deterioration of the nozzle of the combustion burner due to glow can be prevented. As a result, it is possible to increase the lifespan of the combustion burner.

In the deposition mode, it is possible to exclude inert gas or the like which hinders a combustion reaction. Therefore, it is possible to prevent a reduction in deposition efficiency.

Since a flame is maintained by the pilot light, separate devices for re-ignition is not needed for a mode transition from the non-deposition mode to the deposition mode (ignition), and it is possible to reliably and rapidly ignite the combustion burner. Therefore, it is possible to prevent a reduction in deposition efficiency.

The above-mentioned burner structure does not require a sealing layer or the like around the oxygen nozzle and only a function for changing gas between the combustion gas and the purge gas may need to be added to the gas system to obtain the burner structure. Therefore, the structure of the burner or the gas system is not complicated. As a result, it is possible to prevent the occurrence of initial problems from the start of use due to, for example, the deterioration of the quality (accuracy) of the burner. In addition, since the structure of the burner is simple, a reduction in deposition efficiency is prevented.

As described above, in the present embodiment, it is possible to prevent the deterioration of the nozzle tip due to glow without a reduction in deposition efficiency. In particular, it is possible to effectively prevent the deterioration of the nozzle tip when a mode change is frequently reiterated in the order of the deposition mode→the non-deposition mode (pilot light state)→the deposition mode.

The apparatus for manufacturing the optical fiber preform according to the present embodiment includes the combustion burner 3 having the above-mentioned structure; and the gas change mechanism which, when the mode is changed from the deposition mode to the non-deposition mode, changes the gas discharged from the combustion gas port A from the combustion gas to the purge gas while maintaining the pilot light of the combustion burner 3 with the combustion gas from the combustion gas port 33B and maintaining the flow rate of the supporting gas discharged from the supporting gas discharge nozzle 34 of the combustion gas port 33A to be equal to or more than the flow rate at which the nozzle tip of the supporting gas discharge nozzles 34 does not glow. After the change operation, the gas change mechanism may stop the discharge of the supporting gas or change the gas discharged from the supporting gas discharge nozzle 34 to the purge gas. Therefore, according to the apparatus for manufacturing the optical fiber preform, it is possible to prevent the deterioration of the nozzle tip due to glow with a simple structure and to increase the lifespan of the combustion burner 3.

Figure 6:
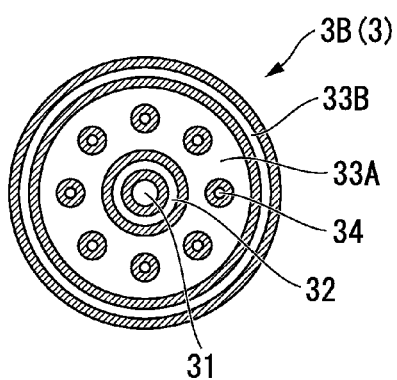
FIG. 6 is a view illustrating another example of the nozzle portion of the combustion burner, as viewed from the tip side.

In the embodiment, the combustion burner 3A has the nozzle structure in which the combustion gas port 33B is arranged inside the combustion gas port 33A, but the present invention is not limited thereto. For example, a combustion burner 3B (3) shown in FIG. 6 may be used in which the combustion gas port 33A is arranged inside the combustion gas port 33B.

Figure 7:
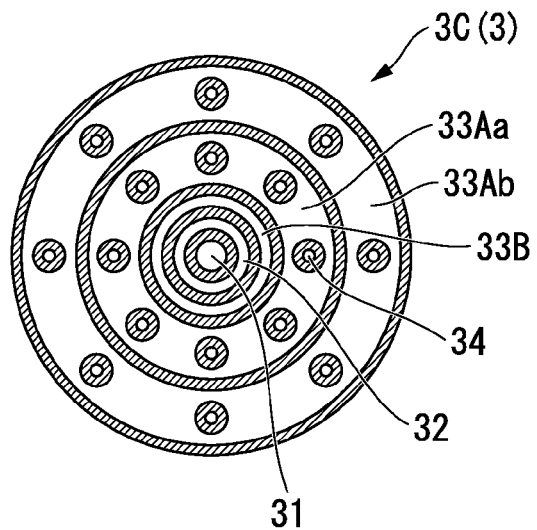
FIG. 7 is a view illustrating another example of the nozzle portion of the combustion burner, as viewed from the tip side.

In the embodiment, an example of the combustion burner including one combustion gas port 33A and one combustion gas port 33B is explained, but the present invention is not limited thereto. The combustion burner 3 may included two or more combustion gas ports 33A and/or combustion gas ports 33B. For example, as a combustion burner 3C (3) shown in FIG. 7, a configuration which includes two combustion gas ports 33A (33Aa and 33Ab) may be employed.

Figure 8:
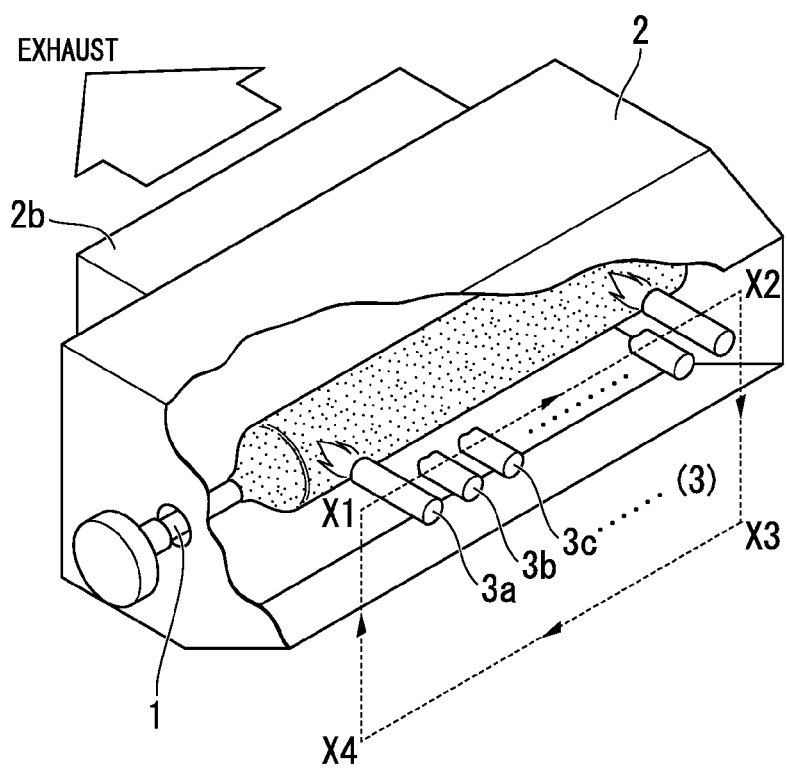
FIG. 8 is a schematic view illustrating an example of a manufacturing apparatus system used in a method for manufacturing an optical fiber preform.

In the embodiment, an example including one combustion burner 3 for glass particle synthesis is explained, but the present invention is not limited thereto. For example, as shown in FIG. 8, a plurality of combustion burners $3a$, $3b$, $3c$, . . . (3) for glass particle synthesis may be provided.

In the embodiment, the chamber 2 including the opening portion $2a$ in which the combustion burner 3 is arranged and traversed is explained, but the structure of the chamber 2 is not limited thereto. For example, the chamber may have a slit (gap) only for the passage of the combustion burner 3, not the large opening portion $2a$.

EXAMPLES

Next, examples and comparative examples of the present invention will be described.

Example 1

A combustion burner having the nozzle structure shown in FIG. 3 was traversed plural times from one direction in the axis direction of a rotating target member to form a glass particle deposition layer on the periphery of the target member, thereby obtaining a glass particle deposited body. An optical fiber preform was manufactured from the glass particle deposited body.

The following steps were alternately performed plural times: a step α which, when the mode is changed from the deposition mode in which the glass particles are deposited on the periphery of the target member to the non-deposition mode in which the glass particles are not deposited, changes gas discharged from a combustion gas port A from combustion gas to purge gas, while maintaining a pilot light of the combustion burner with combustion gas from a combustion gas port B and maintaining the flow rate of supporting gas discharged from supporting gas discharge nozzles of the combustion gas port A to be equal to or greater than a flow rate at which the nozzle tip of the supporting gas discharge nozzles does not glow; and a step β which, when the mode is changed from the non-deposition mode to the deposition mode, changes the gas discharged from the combustion gas port A from the purge gas to the combustion gas while maintaining the pilot light of the combustion burner with the combustion gas from the combustion gas port B and maintaining the flow rate of the supporting gas discharged from the supporting gas discharges nozzle of the combustion gas port A to be equal to or greater than the flow rate at which the nozzle tip of the supporting gas discharge nozzles does not glow. In the non-deposition mode, while the purge gas was fed to the combustion gas port A, the supply of the supporting gas was stopped.

With the above-described method, 100 optical fiber preforms were manufactured.

The state of the nozzle tip was visually observed during the step α or the step β.

As a result, the glow of the nozzle and the deformation of the nozzle were not observed in any step. Note that the flow rate of the combustion gas ($H_2$ gas) used to maintain the pilot light was 10 slm.

Example 2

100 optical fiber preforms were manufactured by the same method as that in Example 1 except that the flow rate of the combustion gas ($H_2$ gas) used to maintain the pilot light was 7 slm.

As a result, the pilot light was extinguished during the manufacture of the third preform. Thereafter, the flow rate of the supporting gas ($O_2$ gas) used to maintain the pilot light was set to 4 slm. The pilot light was not extinguished in manufacturing 100 optical fiber preforms after that.

Example 3

Optical fiber preforms were manufactured by the same method as that in Example 1 except that the supply of the combustion gas to the combustion gas port B was stopped to extinguish the pilot light.

While the optical fiber preforms were manufactured, the state of the nozzle tip was visually observed. As a result, the glow of the nozzle was not observed.

Example 4

Optical fiber preforms were manufactured by the same method as that in Example 1 except that, when the mode is changed from the non-deposition mode to the deposition mode, ignition was performed by supplying the combustion gas to the combustion gas port B, the supporting gas was fed to the combustion gas port A at a flow rate equal to or greater than a flow rate at which the nozzle tip of the supporting gas discharge nozzles did not glow and the combustion gas was supplied thereto to start combustion.

While the optical fiber preforms were manufactured, the state of the nozzle tip was visually observed. As a result, the glow of the nozzle was not observed.

Comparative Example 1

Figure 9:
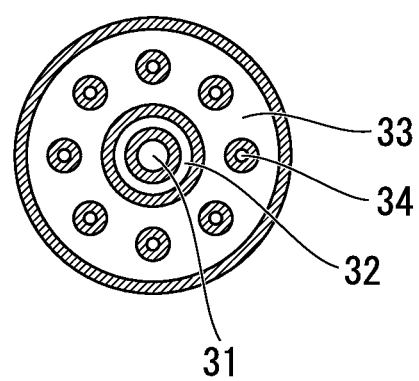
FIG. 9 is a view illustrating an example of a nozzle portion of a combustion burner according to the related art, as viewed from the tip side.

Optical fiber preforms were manufactured by a burner with a nozzle structure shown in FIG. 9. When the mode was changed from the deposition mode to the non-deposition mode, the gas discharged from the supporting gas discharge nozzles was changed from the supporting gas ($O_2$ gas) to the purge gas. With the above-described method, 100 optical fiber preforms were manufactured.

During the process, the state of the nozzle tip was visually observed.

As a result, the glow of the nozzle tip was observed both when the flame of the combustion burner 3 was changed from a flame corresponding to the deposition mode to a pilot light and when the flame was changed from the pilot light to a flame corresponding to the deposition mode.

In addition, the nozzle was deformed while 100 optical fiber preforms were manufactured and deposition efficiency was reduced by 20%.

Comparative Example 2

Optical fiber preforms were manufactured by the same method as that in Comparative example 1 except that the supporting gas ($O_2$ gas) and the combustion gas ($H_2$ gas) were extinguished in this order.

While the optical fiber preforms were manufactured, the state of the nozzle tip was visually observed. As a result, the glow of the nozzle was observed.

Comparative Example 3

Optical fiber preforms were manufactured by the same method as that in Comparative example 1 except that, when the mode was changed from the non-deposition mode to the deposition mode, the combustion gas ($H_2$ gas) and the supporting gas ($O_2$ gas) were ignited in this order. While the optical fiber preforms were manufactured, the state of the nozzle tip was visually observed. As a result, the glow of the nozzle was observed.

According to the above-mentioned results, the following was confirmed. That is, the comparison between Example 1 and Comparative example 1 proved that, when the method according to the embodiment was used during a mode change from the deposition mode to the non-deposition mode or from the non-deposition mode to the deposition mode, there was no chance for the nozzle tip to be heated to a high temperature and it was possible to prevent the deterioration of the nozzle tip due to glow.

In addition, the comparison between Example 3 and Comparative example 2 proved that, when the supply of the combustion gas to the combustion gas port B was stopped for performing extinguishment, it was possible to prevent the deterioration of the nozzle tip due to glow and rapidly and naturally extinguish a flame.

The comparison between Example 4 and Comparative example 3 proved that, when the pilot light was maintained by one combustion gas port, feeding the combustion gas to the other adjacent combustion gas port made it possible prevent the deterioration of the nozzle tip due to glow and reliably and naturally ignite the other adjacent combustion gas port.

The apparatus and method for manufacturing the optical fiber preform according to the embodiment of the present invention have been described above. However, the present invention is not limited thereto, but can be appropriately changed without departing from the scope of the present invention.

The present invention can be widely applied to an apparatus and method for manufacturing an optical fiber preform using a so-called outside vapor-deposition method. In addition, the present invention is particularly effective in a deposition method in which the pilot light state is frequently reiterated. In addition, the present invention is effective in a general porous body manufacturing method in which ignition and extinguishment are reiterated.

What is claimed is:

1. A method for manufacturing an optical fiber preform, the method comprising
using a combustion burner including a glass source material gas discharge nozzle and two combustion gas ports that are adjacent to each other and are arranged in the vicinity of the glass source material gas discharge nozzle, the two combustion gas ports including: a combustion gas port A which includes a plurality of supporting gas discharge nozzles with a small diameter arranged so as to be close to the glass source material gas discharge nozzle; and a combustion gas port B which does not include the supporting gas discharge nozzle, burning a mixed gas including a glass source material gas from the glass source material gas discharge nozzle, a combustion gas from the combustion gas ports, and a supporting gas from the supporting gas discharge nozzle to deposit glass particles on a periphery of a target member, and at least one of:
a step α of when a mode is changed from a deposition mode in which the glass particles are deposited on the periphery of the target member to a non-deposition mode in which the glass particles are not deposited on the periphery of the target member, changing a gas discharged from the combustion gas port A from the combustion gas to a purge gas, while maintaining a pilot light of the combustion burner with the combustion gas from the combustion gas port B and maintaining a flow rate of the supporting gas discharged from the supporting gas discharge nozzles of the combustion gas port A to be equal to or greater than a flow rate at which a nozzle tip of the supporting gas discharge nozzles does not glow; and a step β of, when the mode is changed from the non-deposition mode in which the glass particles are not deposited on the periphery of the target member to the deposition mode in which the glass particles are deposited on the periphery of the target member, changing a gas discharged from the combustion gas port A from a purge gas to the combustion gas, while maintaining a pilot light of the combustion burner with the combustion gas from the combustion gas port B and maintaining the flow rate of the supporting gas discharged from the supporting gas discharge nozzles of the combustion gas port A to be equal to or greater than the flow rate at which the nozzle tip of the supporting gas discharge nozzles does not glow.

2. The method for manufacturing an optical fiber preform according to claim 1, wherein
the method comprises the step α, and
after the gas is changed from the combustion gas to the purge gas, the flow rate of the supporting gas is maintained or reduced, the discharge of the supporting gas from the supporting gas discharge nozzle is stopped, or the gas discharged from the supporting gas discharge nozzle is changed from the supporting gas to a purge gas.

3. The method for manufacturing an optical fiber preform according to claim 1, wherein
the method comprises the step β, and
before the step β, the flow rate of the supporting gas is maintained or increased, the discharge of the supporting gas from the supporting gas discharge nozzle starts, or the gas discharged from the supporting gas discharge nozzle is changed from a purge gas to the supporting gas.

4. The method for manufacturing an optical fiber preform according to claim 1, wherein the method comprises the step α and the step β.

* * * * *